United States Patent
Lennevi et al.

(10) Patent No.: US 10,065,632 B2
(45) Date of Patent: Sep. 4, 2018

(54) METHOD AND ARRANGEMENT FOR OPERATING A HYBRID ELECTRICAL VEHICLE

(71) Applicant: VOLVO TRUCK CORPORATION, Göteborg (SE)

(72) Inventors: Jerker Lennevi, Lerum (SE); Tobias Smidebrant, Göteborg (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 14/770,066

(22) PCT Filed: Mar. 11, 2013

(86) PCT No.: PCT/EP2013/000708
§ 371 (c)(1),
(2) Date: Aug. 24, 2015

(87) PCT Pub. No.: WO2014/139542
PCT Pub. Date: Sep. 18, 2014

(65) Prior Publication Data
US 2016/0001768 A1    Jan. 7, 2016

(51) Int. Cl.
*B60W 20/50*     (2016.01)
*B60W 20/20*     (2016.01)
(Continued)

(52) U.S. Cl.
CPC ............ *B60W 20/20* (2013.01); *B60L 3/0023* (2013.01); *B60L 3/0046* (2013.01); *B60L 11/14* (2013.01);
(Continued)

(58) Field of Classification Search
CPC ......... B60W 20/20; B60L 11/14; B60L 11/02; B60L 3/0046
(Continued)

(56) References Cited

U.S. PATENT DOCUMENTS 6,335,574 B1    1/2002  Ochiai et al.
6,488,107 B1   12/2002  Ochiai et al.
(Continued)

FOREIGN PATENT DOCUMENTS

CN    102166959 A    8/2011
CN    103373296 A   10/2013
(Continued)

OTHER PUBLICATIONS

International Search Report (dated Dec. 9, 2013) or corresponding International App. PCT/EP2013/000708.
(Continued)

*Primary Examiner* — Nadeem N Odeh
(74) *Attorney, Agent, or Firm* — WRB-IP LLP

(57) ABSTRACT

A method is provided for operating a hybrid electric vehicle including an internal combustion engine and an electrical system, which electrical system includes at least one electronic control unit, an engine-driven electric machine (operable as a motor for driving the vehicle or as a generator for supplying power to one or more electrical loads via a high voltage traction bus, and a high voltage battery pack coupled to the high voltage traction bus by at least one contactor arranged to connect the battery pack to the high voltage traction bus. If it is determined that the at least one parameter indicates a condition preventing the battery pack from being connected to the high voltage bus, the electric machine is operated in voltage control mode during operation of the vehicle until the condition is eliminated, whereafter the high voltage bus is pre-charged and the high voltage battery pack reconnected.

15 Claims, 2 Drawing Sheets

(51) Int. Cl.
  *B60L 3/00* (2006.01)
  *B60W 10/00* (2006.01)
  *F02N 11/08* (2006.01)
  *B60L 11/14* (2006.01)
  *B60L 11/18* (2006.01)
  *B60L 15/20* (2006.01)

(52) U.S. Cl.
  CPC ........... *B60L 11/1864* (2013.01); *B60L 15/20* (2013.01); *B60W 10/00* (2013.01); *F02N 11/0866* (2013.01); *B60L 2200/36* (2013.01); *B60L 2210/10* (2013.01); *B60L 2210/30* (2013.01); *B60L 2210/40* (2013.01); *B60L 2240/547* (2013.01); *B60L 2240/549* (2013.01); *B60L 2250/10* (2013.01); *B60L 2260/26* (2013.01); *Y02T 10/645* (2013.01); *Y02T 10/70* (2013.01); *Y02T 10/7005* (2013.01); *Y02T 10/7061* (2013.01); *Y02T 10/7077* (2013.01); *Y02T 10/7216* (2013.01); *Y02T 10/7241* (2013.01); *Y02T 10/7275* (2013.01)

(58) Field of Classification Search
  USPC .......................................................... 701/22
  See application file for complete search history.

(56) References Cited

U.S. PATENT DOCUMENTS

2002/0167223 A1* 11/2002 Yamazaki ........... B60L 11/1851
                                                                    307/9.1
2007/0276556 A1* 11/2007 Noel ........................ B60K 6/46
                                                                    701/22
2010/0236851 A1*  9/2010 Van Maanen ......... B60L 3/0046
                                                                    180/65.265
2011/0210746 A1    9/2011 Yugou et al.
2013/0285581 A1   10/2013 Meyer et al.

FOREIGN PATENT DOCUMENTS

| JP | 200165437 A | 3/2001 |
|---|---|---|
| JP | 2001128305 | 5/2001 |
| JP | 2003319507 | 11/2003 |
| JP | 2004032871 | 1/2004 |
| JP | 2005295697 | 10/2005 |
| JP | 2009184559 | 8/2009 |
| JP | 2010259274 | 11/2010 |
| JP | 2011091899 | 5/2011 |
| WO | 2005085630 A1 | 9/2005 |

OTHER PUBLICATIONS

International Preliminary Report on Patentability (2015-061-01) for correspondinrg International App. PCT/EP2013/000708.
Chinese Official Action (Sep. 5, 2016) for corresponding Chinese App. 20130073917.8.
Japanese Official Action (dated Oct. 24, 2016) for corresponding Japanese App. 2015-561943.
Japanese Official Action (dated Mar. 26, 2018) for corresponding Japanese App. 2015-561943.

* cited by examiner

METHOD AND ARRANGEMENT FOR OPERATING A HYBRID ELECTRICAL VEHICLE

BACKGROUND AND SUMMARY

The invention relates to a method for connecting a battery in a hybrid electric vehicle, which vehicle comprises a high voltage battery pack, an electric machine operable in generating and motoring modes and an internal combustion engine for driving the electric machine and/or the vehicle. More particularly the invention relates to a method for operating the electric machine that permits continued operation of the engine and electric machine as the battery pack is connected to the electrical system while the vehicle is in motion.

Generally, a hybrid electric vehicle combines electric propulsion with traditional internal combustion engine propulsion to achieve enhanced fuel economy and/or lower exhaust emissions. Electric propulsion has typically been generated through the use of batteries and electric motors. Such an electric propulsion system provides the desirable characteristics of high torque at low speeds, high efficiency, and the opportunity to regeneratively capture otherwise lost braking energy. Propulsion from an internal combustion engine provides high energy density, and enjoys an existing infrastructure and lower costs due to economies of scale. By combining the two propulsive systems with a proper control strategy, the result is a reduction in the use of each device in its less efficient range. Furthermore, in a parallel hybrid configuration, the combination of a downsized engine with an electric propulsion system into a minimal hybrid electric vehicle results in a better utilization of the engine, which improves fuel consumption. Furthermore, the electric motor and battery can compensate for reduction in the engine size.

These parallel hybrid vehicles perform various controls, for example, when the vehicle accelerates, the electric motor assists the output of the engine, and when the vehicle decelerates, the electric motor generates electric power by deceleration regeneration to charge a battery, etc. Therefore, it is possible to constantly maintain electrical energy, i.e. the remaining battery charge, in the battery and to respond to demands made by the driver on the vehicle.

In the hybrid vehicle, it is not only possible to start the engine using a starter motor dedicated for starting the engine, but also it is possible to start the engine using a driving motor for running the vehicle.

A problem with conventional hybrid vehicles, when starting the engine, is that the selection of the starter motor or the driving motor has not been appropriately performed while taking into consideration the protection of various devices and parts in the hybrid vehicles. Moreover, in the conventional hybrid vehicles, when starting the engine, the selection of the starter motor or the driving motor has not been appropriately performed in consideration of the case where drivers wish to start the engine quickly or when power from the main battery pack is not available at the time of starting.

A further problem relates to the connection of the main battery pack when the vehicle is in motion. If the main battery is not connected to the high voltage bus at start-up, or if a temporary malfunction causes the battery pack to be disconnected after start-up, then the vehicle is usually required to be stationary before a reconnection can be carried out.

In the subsequent text, the term "high voltage" is used for systems operating on voltages over 100 V, typically on 300 V or more. Similarly, the term "low voltage" is used for systems operating on voltages in the region 12-42 V.

According to a preferred embodiment, the invention relates, according to an aspect thereof, to a method for operating a hybrid electric vehicle comprising an internal combustion engine and an electrical system which electrical system comprises, an electronic control unit; an engine-driven electric machine operable as a motor for driving the vehicle or as a generator for supplying power to one or more electrical loads via a high voltage bus. A high voltage battery pack is coupled to the high voltage bus by at least one contactor arranged to connect the battery pack to the high voltage bus.

The method involves performing the steps of
detecting at least one parameter related to the state of the electrical system;
determining if the at least one parameter indicates a condition preventing the battery pack from being connected to the high voltage bus,
monitoring the condition and determining if the state of the electrical system allows the battery pack to be connected to the high voltage traction bus;
driving the electric machine as a generator using the engine,
operating the electric machine in voltage control mode during operation of the vehicle;
pre-charging the high voltage traction bus using the electric machine, and, if the condition is eliminated,
closing the at least one contactor to connect the high voltage battery pack to the traction voltage bus during operation of the vehicle.

According to an aspect of the invention the vehicle is operated in voltage control mode from engine start, if the battery pack is prevented from being connected to the high voltage traction bus at startup. Alternatively, if the battery pack is disconnected from the high voltage traction bus during operation of the vehicle, the vehicle is operated in voltage control mode until it is detected that it is possible to reconnect the battery pack. In both cases the at least one parameter indicating a condition preventing the battery pack from being connected to the high voltage traction bus is monitored. If and when this condition is eliminated, the battery pack can be connected to the high voltage traction bus while the vehicle is being operated.

Hence, a first example involves detecting at least one parameter related to the state of the electrical system prior to operation of the vehicle and starting the engine using a starter motor if the at least one parameter indicates a condition preventing the battery pack from being connected to the high voltage traction bus. A starter motor for starting the internal combustion engine can be connected to an auxiliary battery pack. The electric machine is operated in voltage control mode using the engine until the battery pack can be connected.

A second example involves detecting at least one parameter related to the state of the electrical system during operation of the vehicle and operating the electric machine in voltage control mode using the engine if a detected parameter causes disconnection of the battery pack.

The at least one detected parameter can be that the high voltage battery has a battery temperature below a predetermined threshold, that a detected parameter is that a pre-charge resistor is inoperable, that a detected parameter is that a pre-charge circuit switch is inoperable, that a self-diagnostic test has not been completed, or that a detected parameter is that the high voltage battery is connected to a battery charger. It should be noted that these parameters do not comprise an exhaustive list of possible detectable parameters associated with a condition that can cause a malfunction in the electrical system.

The electric machine is operated in voltage control mode prior to closing the at least one contactor for pre-charging the high voltage traction bus capacitance to a desired voltage within a predetermined range of the battery pack voltage. The at least one contactor is closed to connect the high voltage battery pack to the high voltage traction bus when the voltage of the high voltage traction bus is within the predetermined range.

The invention further relates, according to an aspect thereof, to a hybrid electric vehicle comprising an internal combustion engine and an electrical system which electrical system comprises an electronic control unit. An engine-driven electric machine is operable as a motor for driving the vehicle or as a generator for supplying power to one or more electrical loads via a high voltage traction bus. A high voltage battery pack is coupled to the high voltage traction bus by at least one contactor arranged to connect the battery pack to the high voltage traction bus. The engine can be started either by the starter motor using an auxiliary, low voltage battery, or by the electric machine using the high voltage battery pack.

The electronic control unit is arranged to detect at least one parameter related to the state of the electrical system. The electronic control unit is further arranged to determine if the at least one parameter indicates a condition preventing the battery pack from being connected to the high voltage traction bus. If such a condition is detected, the electronic control unit is arranged to monitor the condition and to determine if the state of the electrical system allows the battery pack to be connected to the high voltage traction bus.

The electric machine is arranged to be driven as a generator using the engine, wherein the electric machine is arranged to be operated in voltage control mode during operation of the vehicle. The electric machine is operated in voltage control mode while the battery pack is disconnected from the high voltage traction bus. The electric machine is arranged to pre-charge the high voltage traction bus while the condition preventing the battery pack from being connected exists. The electronic control unit is arranged to close the at least one contactor to connect the high voltage battery pack to the high voltage traction bus during operation of the vehicle, if it is determined that the condition is eliminated.

As indicated above, the vehicle is operated in voltage control mode from engine start, if the battery pack is prevented from being connected to the high voltage traction bus at start-up, or if the battery pack is disconnected from the high voltage traction bus during operation of the vehicle.

According to a first example, the electronic control unit is arranged to start the engine by means of a starter motor if the at least one parameter indicates a condition preventing the battery pack from being connected to the high voltage traction bus is determined prior to operation of the vehicle, that is, before or during an engine start-up sequence. A starter motor can be connected to an auxiliary battery pack for starting the engine.

According to a second example the electronic control unit is arranged to detect at least one parameter related to the state of the electrical system during operation of the vehicle and the engine is arranged to operate the electric machine in voltage control mode if the battery pack is disconnected from the high voltage traction bus while the vehicle is being operated.

The electric machine is arranged to be operated in voltage control mode to pre-charge the high voltage traction bus capacitance to a desired voltage within a predetermined range of the battery pack voltage. Following the pre-charge, the at least one contactor is arranged to close to connect the high voltage battery pack to the high voltage traction bus when the voltage of the high voltage traction bus is within the predetermined range.

The at least on detected parameter can be that the high voltage battery has a battery temperature below a predetermined threshold, that a detected parameter is that a pre-charge resistor is inoperable, that a detected parameter is that a pre-charge circuit switch is inoperable, or that a detected parameter is that the high voltage battery is connected to a battery charger.

The present invention also relates to a computer program, computer program product and a storage medium for a computer all to be used with a computer for executing the method as described in any one of the above examples.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
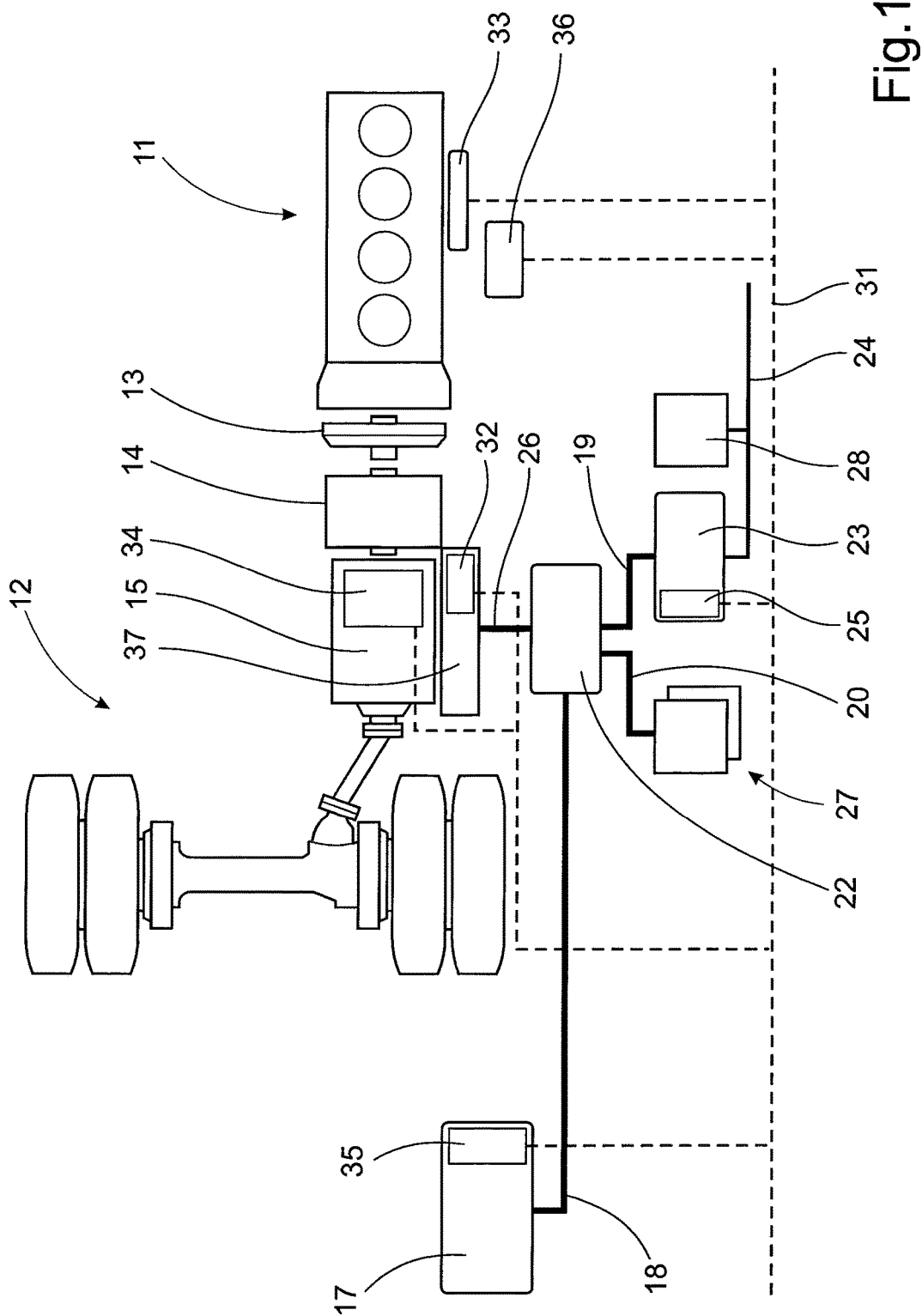
FIG. 1 shows a schematically indicated hybrid vehicle for use with a method according to the invention.

FIG. 1 shows a schematically indicated hybrid vehicle comprising a combustion engine 11 that is mechanically coupled to a set of drive wheels 12 through a clutch 13, an electric machine 14, a gearbox 15 and a transmission shaft. The electric motor/generator 14 is connected to a high voltage battery pack 17 and is controlled by a power conversion system. The electric machine 14 is a motor/generator selectively operable in generating and motoring modes, and is mechanically coupled to the engine 11, either directly, as shown in FIG. 1, or by way of a suitable transmission, such as a drive belt. The power conversion system comprises a number of high voltage DC buses 18, 19, 20, 26, a high voltage junction box 22, a DC/DC converter 23 connecting the high voltage bus 19 to a low voltage DC bus 24, and a DC/DC Control Unit (DCU) 25 for controlling the operation of the DC/DC converter 23. In the subsequent text, the numerals 18, 19, 20, 26 all refer to different DC buses making up the assembled high voltage bus. The DC bus connecting the high voltage junction box 22 to the electric motor/generator 14 will be referred to as a high voltage traction bus 26.

In the example shown in FIG. 1, the high voltage junction box 22, also termed hybrid junction box, is used for joining and distributing high voltage buses to a number of different electrical components. A battery charger (not shown) for the high voltage battery pack 17 would also be connected to the high voltage junction box 22 via a socket. A first high voltage bus 18 connects the high voltage battery pack 17 to the high voltage junction box 22. The high voltage battery pack 17 is provided with a Battery Management Unit (BMU) 35 comprising a power connector and electronics (not shown) for controlling the battery pack 17 and the cells making up the battery pack 17. The power connector can comprise a fuse in parallel with a controlled element or contactor such as a relay, or a fuse in series with a relay. The function of the power connector will be described in connection with FIG. 2 below. The on/off state of the relay is controlled by the BMU 35. A second high voltage bus 19 connects the low voltage DC bus 24 and the DC/DC converter 23 to the high voltage junction box 22. A third high voltage bus 20 connects the high voltage junction box 22 to one or more high voltage electrical loads, or electric Power Take-Off loads (ePTO:s) 27. A fourth high voltage bus, or high voltage traction bus 26 connects the high voltage junction box 22 to an Electronic Motor Drive (EMD) unit 37. The EMD 37 comprises the power electronics for controlling the electric motor/generator 14, including a Motor Control Unit (MCU) 32 and an inverter (not shown). Similarly, the combustion engine 11 is controlled by an Electronic Engine Control Unit (EECU) 33 and the gearbox 15 is controlled by a Transmission Electronic Control Unit (TECU) 34. Each control unit 25, 32, 33, 34, 35 is also connected to a wire harness 31 in order to communicate with a Hybrid Power-train Control Unit (HPCU) 36 via, for instance, a CAN bus. The wire harness 31 is connected to a central processing unit (not shown) and transmits/receives control signals to/from the control units.

The low voltage DC bus 24 is connected to various 12- or 24-Volt loads and an auxiliary 12- or 24-Volt storage battery 28. The low voltage DC bus 24 is also connected to the high voltage bus 20 via the DC/DC converter 23 for maintaining the bus voltage and temporarily supplying power to high voltage electrical loads (ePTO) 27, e.g. a steering servo or an air conditioning unit of the vehicle via the junction box 22, in the event of a system failure.

According to an alternative example (not shown), the junction box itself can contain a number of electrical components, such as one or more bus capacitors for maintaining the bus voltage, a power connector connecting the positive side of high voltage bus to a main battery pack, and an inverter connecting a high voltage DC bus to the electric machine via a high voltage traction bus. In this case, the junction box would also be connected to a wire harness connected to a vehicle electrical control system such as a CAN bus.

In the arrangement of FIG. 1 the power connector includes a relay in parallel with a fuse or a thermistor. The BMU 35 is programmed to open the relay when a condition requiring disconnection of the high voltage battery pack 17 is detected. In order to minimize the current that the relay must break and to prevent transient voltages, the MCU 32 ordinarily powers down the inverter and the DCU 25 powers down the DC/DC convener 23 prior to opening the relay. A DC bus capacitance is provided by the DC/DC converter 23 and the EMD 37 for reducing voltage ripple. However, once the relay is open and the battery pack 17 is disconnected, there is insufficient reserve electrical power in the bus capacitor to operate the electric machine 14. Also, the only source of power for the electrical loads 27 is the auxiliary storage battery 28.

A similar situation occurs when a condition preventing connection of the high voltage battery pack 17 is detected during a vehicle start-up procedure. While the battery pack 17 is disconnected the vehicle cannot be operated in electrical mode as the auxiliary storage battery 28 has insufficient electrical power for this purpose.

When a condition preventing connection of the high voltage battery pack 17 is detected, and on the condition that the combustion engine 11 is not already running, the auxiliary storage battery 17 is used to operate a starter motor. The starter motor comprises one of the electrical loads 27 shown in FIG. 1. In either case, when the engine 11 is running it is used for driving the electric machine 14 as a generator. At this time, the electric machine 14 is switched to and operated in voltage control mode while the engine 1 is used for normal operation of the vehicle. This allows the vehicle to be driven and electrical power to the ePTOs 27 and/or at least partial added traction to the driven wheel can be supplied by the electric machine 14 is available while the high voltage battery pack 17 is disconnected. A warning can be transmitted to the driver to indicate that the vehicle can be driven, but that full tractive power may not be available.

The HPCU 36 and/or the BMU 25 will monitor the condition or conditions preventing connection of the high voltage battery pack 17 to the high voltage bus 18, 19, 20, 26. Monitoring is performed by detecting at least one parameter related to the state of the electrical system during operation of the vehicle. Examples of such parameters are that the high voltage battery has a battery temperature below a predetermined threshold, that a pre-charge resistor is inoperable, that a pre-charge circuit switch is inoperable, that a pre-start diagnostics test has not been completed, or that the high voltage battery is connected to a battery charger. This is a non-exhaustive list of parameters indicating the state of the electrical system and which can be monitored to determine whether a condition exists that prevents connection of the high voltage battery pack 17 to the high voltage traction bus 26.

When it is detected that the above condition no longer exists, the HPCU 36 and/or the BMU 25 will initiate a re-connection of the high voltage battery pack 17. The electric machine 14 is operated in voltage control mode prior to closing at least one contactor in order to pre-charge the high voltage bus capacitance to a desired voltage within a predetermined range of the battery pack voltage. The at least one contactor is closed to connect the high voltage battery pack 17 to the high voltage traction bus 26 when the voltage of the high voltage traction bus 26 is within the predetermined range. A suitable voltage range for this purpose can be a range of ±5-10% of the main battery pack voltage.

Figure 2:
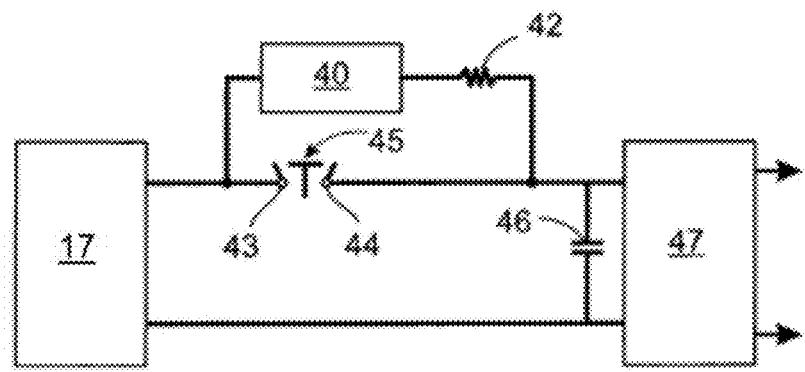
FIG. 2 shows a schematic diagram of a pre-charge circuit suitable for use in a vehicle as indicated in FIG. 1.

FIG. 2 shows a schematic diagram showing an example of a pre-charge circuit having a pre-charge module 40 for controlling power to a load. The pre-charge module 40 can be of a solid state type and configured as a solid state module in series with a pre-charge resistor 42, for example a 10 ohm pre-charge resistor and that are together connected across contacts 43, 44 of a contactor 45. In the illustrated embodiment, the contactor 45 is a main relay or main contactor for switching power on and off to the load. In FIG. 2 the load is indicated as an inverter 47 arranged in the EMD 37 (FIG. 1) within the Hybrid Electric Vehicle. The power that is switched on and off by the contactor 45 is the electric power from the high voltage battery pack 17. It should be noted that although the pre-charge module 40 is described in connection with the particular application in FIG. 1, it is not limited for use in this embodiments and the pre-charge module 40 may be used in any application where pre-charging is required. Pre-charge circuits per se are well known in the field and will not be described in detail here.

In operation, the pre-charge module 40 pre-charges one or more capacitors 46. In the example of FIG. 1, the schematically indicated capacitor is provided in the form of a DC bus capacitance, by the DC/DC converter 23 and the EMD 37. The capacitor 46 can be relatively large, such as, 1000 micro-Farads (mF) or 2000 mF, with the pre-charge module 40 isolating pre-charge voltage from a full power voltage (e.g., 300 volt or 600 volt). The pre-charge module 40 switches on to pre-charge the capacitor 46 when a ground is applied to the pre-charge module 40, and switches off (allowing the contactor 45 to switch on) when the capacitor 46 has reached a desired predetermined pre-charge level, for example, above about 80-95 percent of the total charge capacity of the capacitor 46. However, the pre-charge-relay 40 may be configured to allow the capacitor 46 to reach any predetermined pre-charge level that is higher or lower than the levels described.

The present invention also relates to a computer program, computer program product and a storage medium for a computer all to be used with a computer for executing the method as described in any one of the above examples.

Figure 3:
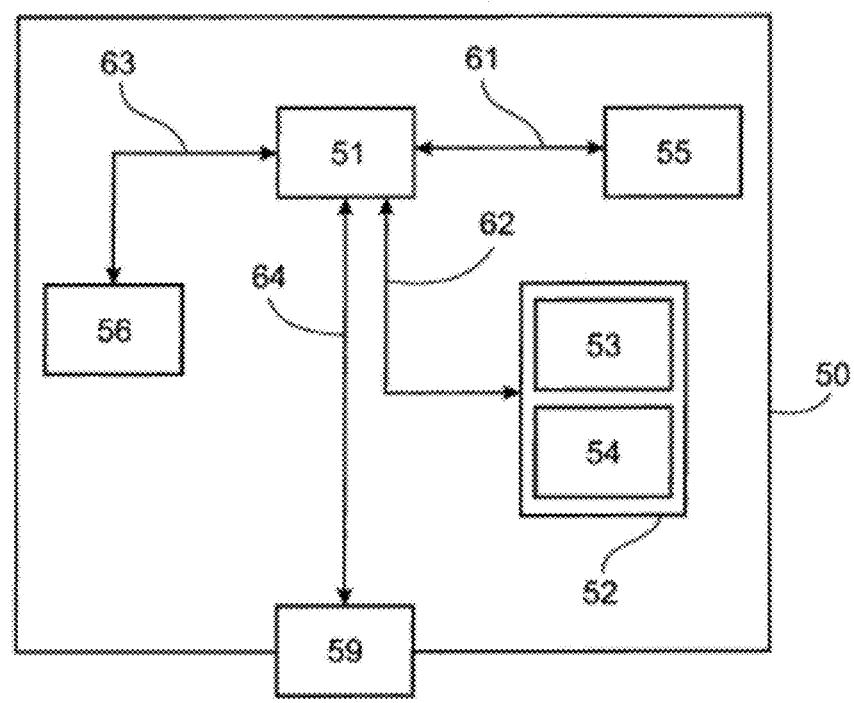
FIG. 3 shows the invention applied on a computer arrangement.

FIG. 3 shows the invention applied on a computer arrangement. FIG. 3 shows an apparatus 50 according to one embodiment of the invention, comprising a nonvolatile memory 52, a processor 51 and a read and write memory 56. The memory 52 has a first memory part 53, in which a computer program for controlling the apparatus 50 is stored. The computer program in the memory part 53 for controlling the apparatus 50 can be an operating system.

The apparatus 50 can be enclosed in, for example, a control unit. The data-processing unit 51 can comprise, for example, a microcomputer.

The memory 52 also has a second memory part 54, in which a program for controlling the target gear selection function according to the invention is stored. In an alternative embodiment, the program for controlling the transmission is stored in a separate nonvolatile storage medium 55 for data, such as, for example, a CD or an exchangeable semiconductor memory. The program can be stored in an executable form or in a compressed state.

When it is stated below that the data-processing unit 51 runs a specific function, it should be clear that the data-processing unit 51 is running a specific part of the program stored in the memory 54 or a specific part of the program stored in the nonvolatile storage medium 55.

The data-processing unit 51 is tailored for communication with the storage memory 55 through a data bus 61. The data-processing unit 51 is also tailored for communication with the memory 52 through a data bus 62. In addition, the data-processing unit 51 is tailored for communication with the memory 56 through a data bus 63. The data-processing unit 51 is also tailored for communication with a data port 59 by the use of a data bus 64.

The method according to the present invention can be executed by the data-processing unit 51, by the data-processing unit 51 running the program stored in the memory 54 or the program stored in the nonvolatile storage medium 55.

The invention should not be deemed to be limited to the embodiments described above, but rather a number of further variants and modifications are conceivable within the scope of the following patent claims.

The invention claimed is:

1. A method for operating a hybrid electric vehicle comprising an internal combustion engine and an electrical system, wherein the electrical system comprises at least one electronic control unit, an engine-driven electric machine operable as a motor for driving the vehicle or as a generator for supplying power to one or more electrical loads via a high voltage traction bus, and a high voltage battery pack coupled to the high voltage traction bus by at least one contactor arranged to connect the high voltage battery pack to the high voltage traction bus, the method comprising the steps of:
   detecting at least one parameter related to a state of the electrical system;
   determining when the at least one parameter indicates a condition preventing the high voltage battery pack from being connected to the high voltage traction bus; and
   during the condition, while the high voltage battery pack is disconnected from the high voltage traction bus:
      driving the electric machine as a generator using the engine while using the engine for operation of the vehicle;
      pre-charging a capacitance of the high voltage traction bus using the electric machine;
      monitoring the condition; and
      when the voltage of the high voltage traction bus capacitance is within a predetermined range of a voltage of the high voltage battery pack and when the state of the electrical system allows the high voltage battery pack to be connected to the high voltage traction bus, closing the at least one contactor to connect the high voltage battery pack to the high voltage traction bus during operation of the vehicle.

2. The method according to claim 1, comprising detecting the at least one parameter related to the state of the electrical system prior to operation of the vehicle; and starting the engine using a starter motor connected to an auxiliary battery pack when the at least one parameter indicates the condition preventing the high voltage battery pack from being connected to the high voltage traction bus.

3. The method according to claim 1, comprising detecting the at least one parameter related to the state of the electrical system during operation of the vehicle and driving the electric machine as a generator using the engine.

4. The method according to claim 1, wherein one of the at least one parameter is that the high voltage battery pack has a battery temperature below a predetermined threshold.

5. The method according to claim 1, wherein one of the at least one parameter is that a pre-charge resistor is inoperable.

6. The method according to claim 1, wherein one of the at least one parameter is that a pre-charge circuit switch is inoperable.

7. A hybrid electric vehicle comprising an internal combustion engine and an electrical system, wherein the electrical system comprises an electronic control unit, an engine-driven electric machine operable as a motor for driving the vehicle or as a generator for supplying power to one or more electrical loads via a high voltage traction bus, and a high voltage battery pack coupled to the high voltage traction bus by at least one contactor arranged to connect the high voltage battery pack to the high voltage traction bus,
   wherein the electronic control unit is arranged to:
      detect at least one parameter related to a state of the electrical system;
      determine when the at least one parameter indicates a condition preventing the high voltage battery pack from being connected to the high voltage traction bus, and
      during the condition, while the high voltage battery pack is disconnected from the high voltage traction bus:
         drive the electric machine as a generator using the engine while using the engine for operation of the vehicle;
         pre-charge the high voltage traction bus using the electric machine;
         monitor the condition; and
         when the voltage of a capacitance of the high voltage traction bus is within a predetermined range of a voltage of the high voltage battery pack and when the state of the electrical system allows the high voltage battery pack to be connected to the high voltage traction bus, close the at least one contactor to connect the high voltage battery pack to the high voltage traction bus during operation of the vehicle.

8. The hybrid electric vehicle according to claim 7, wherein the electronic control unit is arranged to start the engine by means of a starter motor connected to an auxiliary battery pack when the at least one parameter indicates the condition preventing the high voltage battery pack from being connected to the high voltage traction bus is determined prior to operation of the vehicle.

9. The hybrid electric vehicle according to claim 7, wherein the electronic control unit is arranged to detect the at least one parameter related to the state of the electrical system during operation of the vehicle and that the engine is arranged to drive the electric machine as a generator using the engine when the high voltage battery pack is disconnected from the high voltage traction bus.

10. The hybrid electric vehicle according to claim 7, wherein one of the at least one detected parameter is that the high voltage battery pack has a battery temperature below a predetermined threshold.

11. The hybrid electric vehicle according to claim 7, wherein one of the at least one detected parameter is that a pre-charge resistor is inoperable.

12. The hybrid electric vehicle according to claim 7, wherein one of the at least one detected parameter is that a pre-charge circuit switch is inoperable.

13. A computer comprising a program for performing all the steps of claim 1 when the program is run on the computer.

14. A computer program product comprising a program stored on a non-transitory computer readable medium for performing all steps of claim 1 when the program product is run on a computer.

15. A non-transitory computer memory comprising a computer program for performing all the steps of claim 1 when the program is run on a computer.

* * * * *